(12) United States Patent
Owen

(10) Patent No.: US 6,237,821 B1
(45) Date of Patent: May 29, 2001

(54) FISHING ROD HOLDER

(76) Inventor: John Robert William Owen, c/o H. H. Sheik Hamdan Bin Zayed Office P.O. Box 110, Abu Dhabi (AE)

( * ) Notice: Subject to any disclaimer, the term of this patent is extended or adjusted under 35 U.S.C. 154(b) by 0 days.

(21) Appl. No.: 09/490,619

(22) Filed: Jan. 25, 2000

(51) Int. Cl.[7] .............................. A45F 5/00; A01K 97/100
(52) U.S. Cl. .................. 224/200; 224/197; 224/625; 224/251; 224/922; 43/21.2; D3/221; D3/229; D3/260; 248/316.2; 248/316.7
(58) Field of Search .................... 224/149, 200, 224/625, 626, 251, 247, 922, 197; 43/21.2; D3/221, 229, 260; 248/229.11, 229.15, 229.21, 229.25, 230.2, 316.2, 316.7

(56) References Cited

U.S. PATENT DOCUMENTS

| | | | |
|---|---|---|---|
| D. 239,533 | * 4/1976 | Polzin | ................................. D3/260 |
| 507,481 | * 10/1893 | Brooks | ............................. 224/200 X |
| 921,900 | * 5/1909 | Shuster | ............................. 224/247 X |
| 1,439,310 | * 12/1922 | Hay et al. | ......................... 224/625 X |
| 1,858,144 | * 5/1932 | Fariello | ............................. 248/316.2 |
| 2,244,408 | * 6/1941 | Thompson | ....................... 224/922 X |
| 2,576,624 | * 11/1951 | Miller | ................................. 224/200 X |
| 2,954,909 | * 10/1960 | Miller et al. | .......................... 224/200 |
| 2,963,252 | * 12/1960 | Caporicci | ......................... 248/229.15 |
| 3,749,294 | * 7/1973 | Johnston | .............................. 224/200 |
| 4,802,612 | * 2/1989 | Anderson | ......................... 224/200 X |
| 5,632,112 | * 5/1997 | Steinborn | .............................. 43/21.2 |
| 5,813,162 | * 9/1998 | Tse et al. | ......................... 224/200 X |
| 5,992,717 | * 9/1998 | Clewes et al. | .................... 224/220 X |

* cited by examiner

Primary Examiner—Gregory M. Vidovich
(74) Attorney, Agent, or Firm—Michael I Kroll

(57) ABSTRACT

The present invention 10 discloses a fishing rod holder harness comprising a harness member, with straps 20, 22, body pad member 24 and a fishing rod holder member 18. The harness member is comprised of a waist strap 20 and a bandoleer-like shoulder strap 22, each having buckle elements 26 for adjusting the fit to the user 12. The body pad member 24 is comprised of a substantially planar element having a plurality of apertures 46 for threading the straps 20, 22 therethrough and for fastening the fishing rod holder 18 thereto. The fishing rod holder 18 is comprised of a substantially U-shaped tube having apertures 46 whereby the fishing rod holder member 18 can be securely fastened to the body pad member 24 using appropriate fasteners 34. The U-shaped tube element has oppositely opposed apertures 46 for positioning a compression locking member 30 therethrough. The compression-locking member 30 has a shaft element 44 having a pivotally attached L-shaped lever 42 on one distal end and threads 36 on the other. A spring 32 is positioned between the oppositely opposed apertures 46 of the U-shaped tube element for passing the shaft element therethrough. An appropriate fastener 34 is attached to the end of the shaft element, thereby providing a method for increasing or decreasing the gap between the sides 38, 40 of the holder 18.

10 Claims, 7 Drawing Sheets

FISHING ROD HOLDER

BACKGROUND OF THE INVENTION

1. Field of the Invention

The present invention relates generally to fishing equipment and, more specifically, to a fishing rod holder harness comprising a harness member, body pad member and fishing rod holder member.

The harness member is comprised of a belt element and a bandoleer-like element each having buckle elements for adjusting the fit to the user.

The body pad member is comprised of a substantially planar element fabricated from durable material such as leather, plastic, rubber, canvas or metal and has a plurality of apertures for threading the belt element and bandoleer-like element therethrough. The body pad member also has a plurality of apertures for fastening the fishing rod holder thereto.

The fishing rod holder is comprised of a substantially U-shaped tube having apertures on each distal end whereby the fishing rod holder member can be securely fastened to the body pad member using appropriate fasteners. The U-shaped tube element has oppositely opposed apertures for positioning a compression locking member therethrough.

The compression-locking member has a shaft element having a pivotally attached L-shaped lever on one distal end and threads on the other. A spring is positioned between the oppositely opposed apertures of the U-shaped tube element before passing the shaft element therethrough. An appropriate fastener is attached to the end of the shaft element, thereby providing a method for increasing or decreasing the gap between the sides of the tube.

In operation the butt of the fishing rod is inserted into the top end of the tube element. The orifice of the tube being of sufficient size to seat the rod within the tube. The L-shaped lever is in the open position as determined by the larger side of the L-shaped lever being parallel with the shaft element whereby the spring element forces the tube sides into a spaced apart condition. To secure the fishing rod within the holder, the user pivots the L-shaped lever until the short leg is parallel to the shaft element.

It is easily seen that this method provides for single-handed use. Further the body pad can be worn on the right or left side having pivotal means for angularly securing the rod holder to the left or right side.

2. Description of the Prior Art

There are other fishing rod holding devices designed for securing a fishing rod thereto. Typical of these is U.S. Pat. No. 3,282,482 issued to Scharsu on Nov. 1, 1966.

Another patent was issued to Pothetes on Apr. 26, 1988 as U.S. Pat. No. 4,739,914. Yet another U.S. Pat. No. 5,232,137 was issued to Devine on Aug. 3, 1993 and still yet another was issued on Sep. 3, 1996 to Clifton Jr. as U.S. Pat. No. 5,551,610 and still yet another patent was issued to Bebb et al. on Nov. 12, 1996 as U.S. Pat. No. 5,573,167.

U.S. Pat. No. 3,282,482

Inventor: John A. Scharsu

Issued: Nov. 1, 1966

This United States patent discloses a harness taking the form of a pair of belts arranged to be worn by a fisherman to provide means for temporarily holding a fishing rod or the like. The device can be easily positioned on the person of the fisherman to provide a convenient, accessible device for temporarily holding a fishing rod. Further it is inexpensively formed of belting or the like and part of which harness may comprise the conventional belt used on the fisherman's trousers. Still further is the provision of a harness for holding a fishing rod which provides adjustable clamping means for engaging the fishing rod so that the clamping means may be varied relative to one another and relative to the harness as desired.

U.S. Pat. No. 4,739,914

Inventor: Nicholas L. Pothetes

Issued: Apr. 26, 1988

A U-shaped base member has vertical belt receiving slots arranged to support this member on the belt of a person. A jaw assembly is supported on the base member. The jaw assembly has jaws which cooperate to detachably support a fishing rod in the holder. The U-shaped base member is arranged to hold the fishing rod in spaced relation from the fisherman's body. The jaw assembly is supported on the base member by a pivot post, and associated with the pivot post are positioning recesses to provide a plurality of angular adjusted positions of the pole.

U.S. Pat. No. 5,232,137

Inventor: Mark E. Devine

Issued: Aug. 3, 1993

Apparatus for carrying a spray can including an elongated support element, a receptacle for receiving the end of the spray can having a spray valve element and flexible arms for releasably retaining the spray can in position. The receptacle and the flexible arms are releasably attached at predetermined locations on the elongated support element by flexible lock elements.

U.S. Pat. No. 5,551,610

Inventor: Norman E. Clifton, Jr.

Issued: Sep. 3, 1996

Holster for a truncheon, the holster being a unitary folded substantially sheet which is folded along a front portion having meeting edges along a rear portion, and a transverse screw-and-nut combination connecting the two folded portions of the sheet to provide an adjustment to the clamping action of the holster to the truncheon. An optional keeper strap with a quick-opening fastener, and a thumb engageable tab may be included to maintain the truncheon securely in the holster until the tab is pushed to open the holster. A pivotable belt loop member is attached to the holster and is adjustable to provide convenient positions for supporting the holster and truncheon in any position.

U.S. Pat. No. 5,573,167

Inventor: David Bebb et al.

Issued: Nov. 12, 1996

A method is disclosed for using a holder having first and second clips arranged with their mouths facing substantially the same direction. The first clip is provided with an inner surface which is shaped to hold a cylindrical article and a mouth which is normally open so as to allow the legs of this first clip to be urged apart from each other when such a cylindrical article is pressed against it. The holster is mounted at a designated location on the user's body by attaching the second clip to a piece of material worn by the user, with the mouth of the first clip facing generally downwardly. A substantially cylindrical article is inserted into the first clip by placing the article against the mouth of this clip and lifting the article upwardly into contact with its inner surface, with the axis of the first clip's inner surface in a generally horizontal orientation. Preferably, the insertion of the article is performed by balancing it in one of the user's hands, placing the thumb of that hand on an upwardly facing surface of the holder and lifting the article into the first clip by pulling the article and thumb toward each other.

While these fishing rod holders may be suitable for the purposes for which they were designed, they would not be as suitable for the purposes of the present invention, as hereinafter described.

SUMMARY OF THE PRESENT INVENTION

The present invention discloses a fishing rod holder harness comprising a harness member with straps, a body pad member, and a fishing rod holder member. The harness member is comprised of a waist strap a bandoleer-like shoulder strap, each having buckle elements for adjusting the fit to the user. The body pad member is comprised of a substantially planar element having a plurality of apertures for threading the straps therethrough. The body pad member also has a plurality of apertures for fastening the fishing rod holder thereto. The fishing rod holder is comprised of a substantially U-shaped tube-like element having apertures whereby the fishing rod holder member can be securely fastened to the body pad member using appropriate fasteners. The U-shaped tube-like element also has oppositely opposed apertures for positioning a compression locking member therethrough. The compression-locking member has a shaft element having a pivotally attached L-shaped lever on one distal end and threads on the other. A spring is positioned between the oppositely opposed apertures of the U-shaped tube-like element for passing the shaft element therethrough. An appropriate fastener is attached to the end of the shaft element, thereby providing a method for increasing or decreasing the gap between the sides of the rod holder.

The harness member is comprised of a waist strap and a bandoleer-like shoulder strap, each having buckle elements for adjusting the fit to the user.

The body pad member is comprised of a substantially planar element having a plurality of apertures for threading the straps therethrough. The body pad member also has a plurality of apertures for fastening the fishing rod holder thereto.

The fishing rod holder is comprised of a substantially U-shaped tube having apertures whereby the fishing rod holder member can be securely fastened to the body pad member using appropriate fasteners. The U-shaped tube element has oppositely opposed apertures for positioning a compression locking member therethrough.

The compression-locking member has a shaft element having a pivotally attached L-shaped lever on one distal end and threads on the other. A spring is positioned between the oppositely opposed apertures of the U-shaped tube element before passing the shaft element therethrough. An appropriate fastener is attached to the end of the shaft element, thereby providing a method for increasing or decreasing the gap between the sides of the tube.

A primary object of the present invention is to provide a fishing rod holder which can aid the physically challenged as well as the sportsman in securing a fishing rod to a user wearable fishing rod holder.

Another object of the present invention is to provide a fishing rod holder having a harness which can be worn by the user having a fishing rod holder attached thereto.

Yet another object of the present invention is to provide a fishing rod holder having a harness which has a fishing rod holder attached thereto which can be selectively positioned to the right or left side of the user.

Still yet another object of the present invention is to provide a fishing rod holder having a harness which can be selectively adjust to height and girth having a fishing rod holder attached thereto.

Another object of the present invention is to provide a fishing rod holder having a harness and a fishing rod holder which is comprised primarily of a tube wherein the butt of a fishing rod can be inserted.

Yet another object of the present invention is to provide a fishing rod holder having a harness and a holder member having an aperture wherein the butt of a fishing rod can be inserted and having a pivotal member for increases and decreasing the diameter of the tube to selectively release or retain the butt of the fishing rod in the holder.

Additional objects of the present invention will appear as the description proceeds.

The present invention overcomes the shortcomings of the prior art by providing a fishing rod holder harness comprising a harness member, body pad member and fishing rod holder member.

The harness member is comprised of a belt element and a bandoleer-like element each having buckle elements for adjusting the fit to the user.

The body pad member is comprised of a substantially planar element fabricated from durable material such as leather, plastic, rubber, canvas or metal and has a plurality of apertures for threading the belt element and bandoleer-like element therethrough. The body pad member also has a plurality of apertures for fastening the fishing rod holder thereto.

The fishing rod holder is comprised of a substantially U-shaped tube having apertures on each distal end whereby the fishing rod holder member can be securely fastened to the body pad member using appropriate fasteners. The U-shaped tube element has oppositely opposed apertures for positioning a compression locking member therethrough.

The compression-locking member has a shaft element having a pivotally attached L-shaped lever on one distal end and threads on the other. A spring is positioned between the oppositely opposed apertures of the U-shaped tube element before passing the shaft element therethrough. An appropriate fastener is attached to the end of the shaft element, thereby providing a method for increasing or decreasing the gap between the sides of the tube.

In operation the butt of the fishing rod is inserted into the top end of the tube element. The orifice of the tube being of sufficient size to seat the rod within the tube. The L-shaped lever is in the open position as determined by the larger side of the L-shaped lever being parallel with the shaft element whereby the spring element forces the tube sides into a spaced apart condition. To secure the fishing rod within the holder, the user pivots the L-shaped lever until the short leg is parallel to the shaft element.

It is easily seen that this method provides for single-handed use. Further the body pad can be worn on the right or left side having pivotal means for angularly securing the rod holder to the left or right side.

Additionally the fishing rod holder will improve the quality of life for those users who are physically challenged by securing the fishing rod to a fishing rod holder which is securely fastened to a belted harness.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

Further the fishing rod holder has a selective locking member for increasing or decreasing the diameter of the rod holder.

DESCRIPTION OF THE PREFERRED EMBODIMENT(S)

In order that the invention may be more fully understood, it will now be described, by way of example, with reference to the accompanying drawings in which FIGS. 1 through 7 illustrate the present invention being a fishing rod holder.

Figure 1:
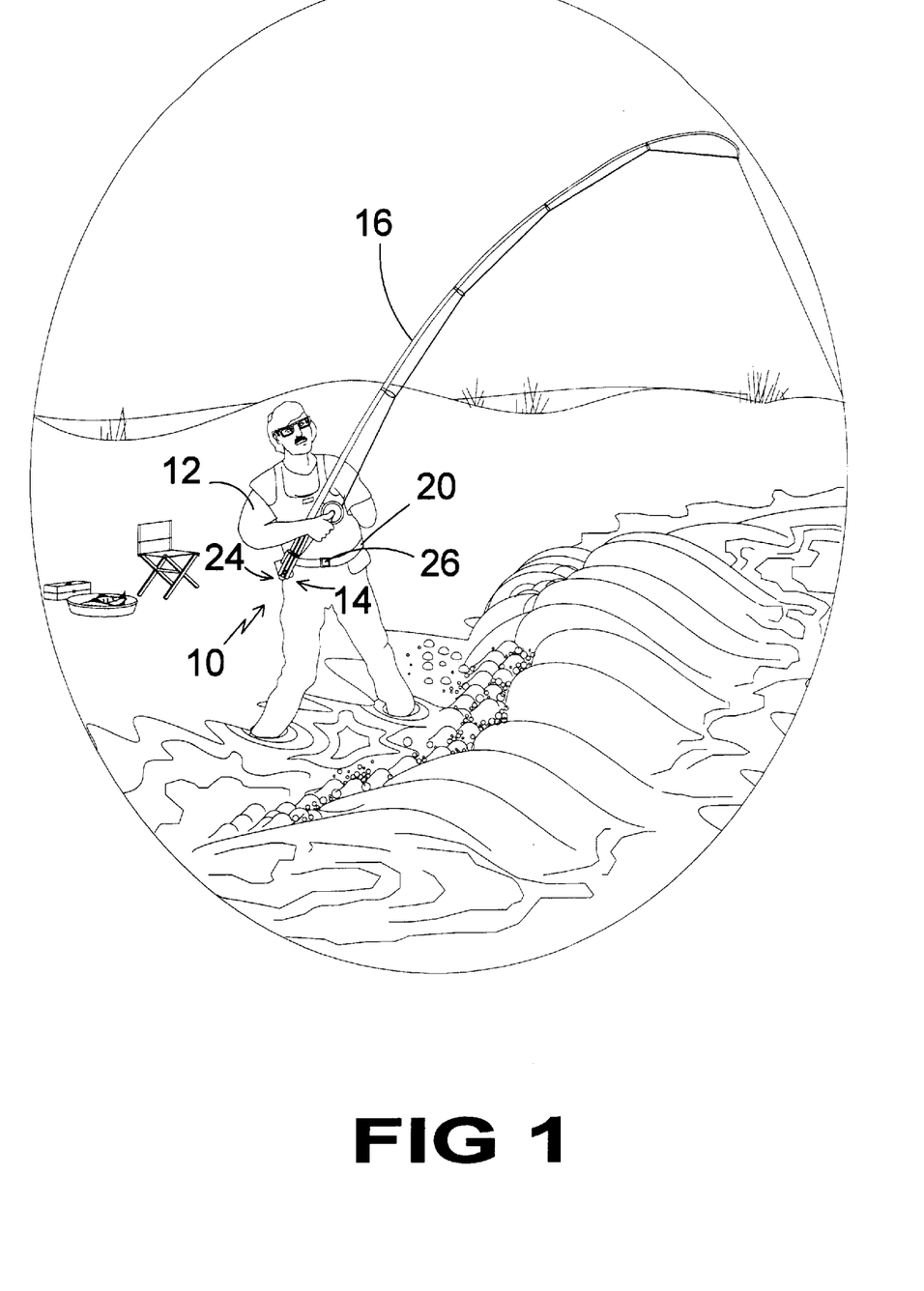
FIG. 1 is a perspective view of the present invention in use. Shown is a physically challenged sportsman wearing the fishing rod holder harness. The body pad can be selectively positioned on either the right or left side of the user. The harness member can be adjusted to fit any size user by independently adjusting the belt element through the belt element buckle and the bandoleer-like belted element through the bandoleer-like buckle element. The butt of the fishing rod can be inserted into the holder and selectively retained therein by engaging the compression-locking member using the pivotal L-shaped handle.

Turning to FIG. 1, shown therein is a perspective view of the present invention 10 in use. Shown is a physically challenged sportsman 12 wearing the fishing rod holder harness member 20. The body pad 24 can be selectively positioned on either the right or left side of the user 12. The harness member 20 can be adjusted to fit any size user by independently adjusting the belt element through the belt element buckle 26. The butt 14 of the fishing rod 16 can be inserted into the holder 10 and selectively retained therein. The body pad member 24 is comprised of a substantially planar element fabricated from durable material such as leather, plastic, rubber, canvas or metal which may be either flexible or substantially rigid.

Figure 2:
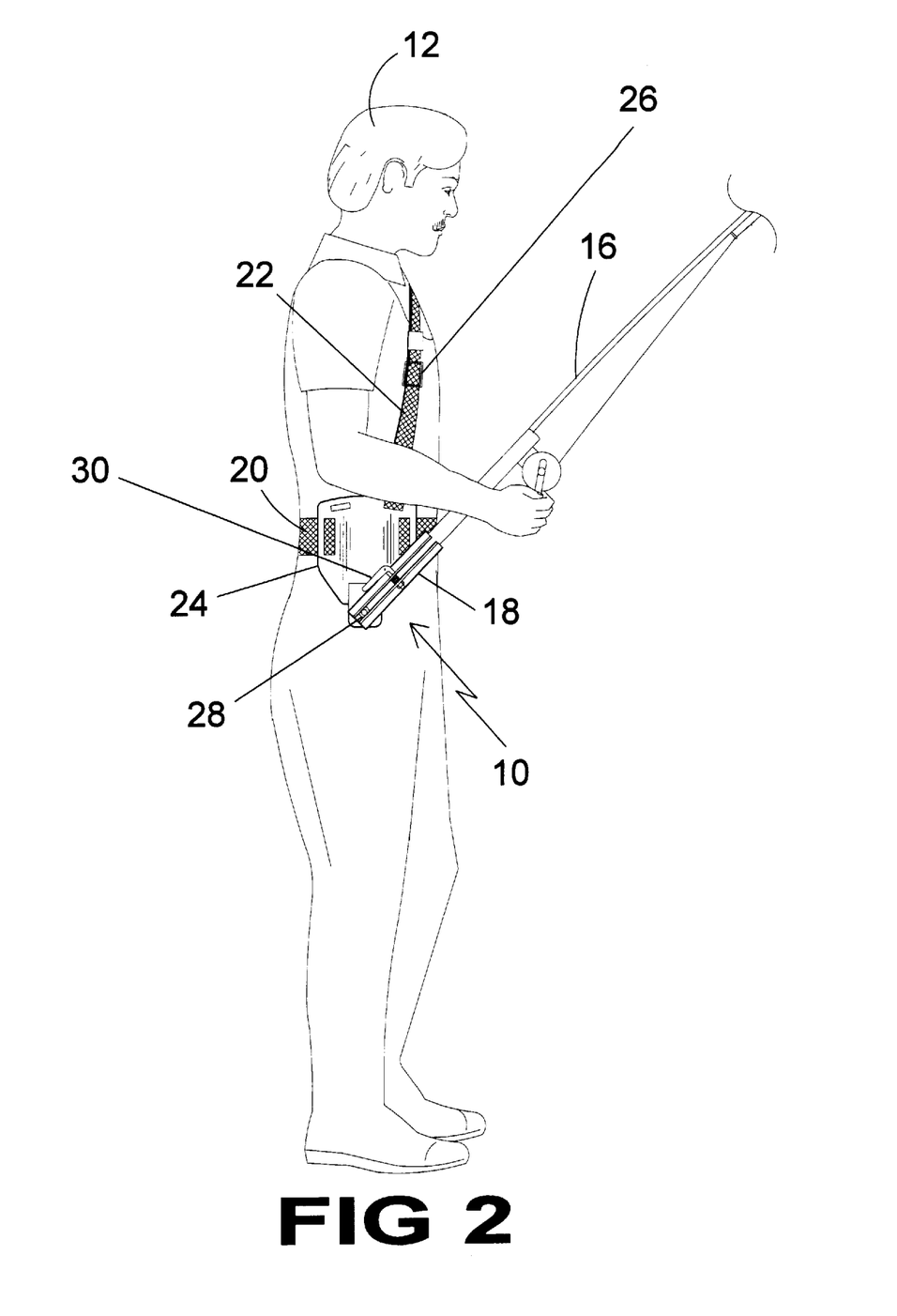
FIG. 2 is a side view of the present invention and sportsman as shown in FIG. 1. Shown is a physically challenged sportsman wearing the fishing rod holder harness having a fishing rod locked into the fishing rod holder. The fishing rod holder harness is comprised of a harness member, body pad member and fishing rod holder member. The harness member can be tensionally adjusted to the height and girth of the user using the appropriate buckle elements. The body pad member which provides a stable platform to secure the fishing rod holder can be selectively located on either the right or left side of the user. Once selectively located the fishing rod holder member is fixedly secured to the body pad member preventing further pivotal movement.

Turning to FIG. 2, shown therein is a side view of the present invention 10 and sportsman 12 as shown in FIG. 1. Shown is a sportsman 12 wearing the fishing rod holder harness having a fishing rod 16 locked into the fishing rod holder 18. The fishing rod holder harness is comprised of a harness member with waist strap 20 and shoulder strap 22, body pad member 24 and fishing rod holder member 18. The harness members can be tensionally adjusted to the height and girth of the user using the appropriate buckle elements 26. The body pad member 24 which provides a stable platform to secure the fishing rod holder 18 can be selectively located on either the right or left side of the user. Once selectively located the fishing rod holder member is fixedly secured to the body pad member using harness bolt 28 preventing further pivotal movement. Further the fishing rod holder has a selective locking member 30 for increasing or decreasing the bore diameter of the rod holder 18.

Figure 3:
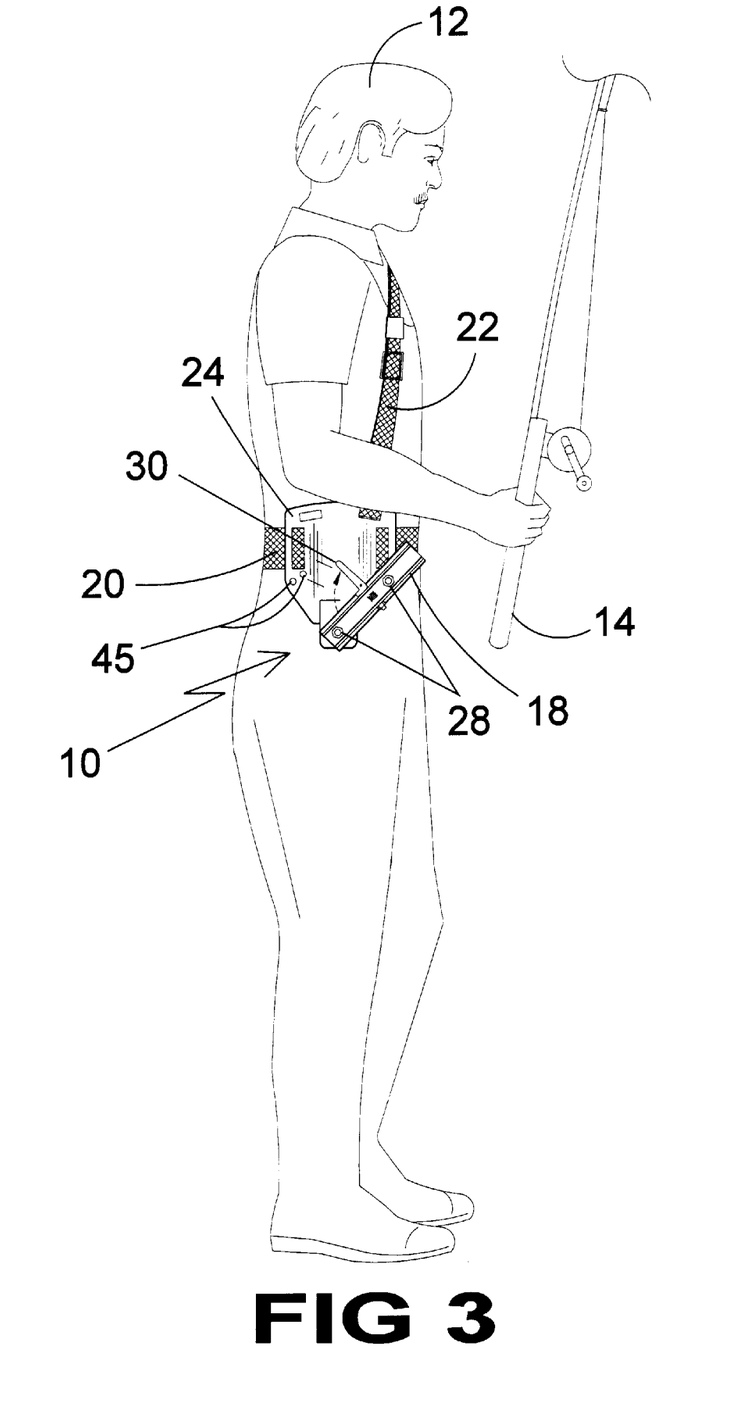
FIG. 3 is a side view of the present invention and sportsman as shown in FIG. 2. Shown is a physically challenged sportsman wearing the harness and fishing rod holder. The fishing rod holder is comprised of a harness member, body pad member and fishing rod holder member. The harness member can be tensionally adjusted to the height and girth of the user. The body pad member which provides a stable platform to secure the fishing rod holder can be selectively located on either the right or left side of the user. The fishing rod holder being bolted to the body pad can be angularly adjusted and fixed secured by the bolt from further pivotal movement. Also shown is the lock-clamping member in the open position where the user can remove the rod for casting and work the lure.

Turning to FIG. 3, shown therein is a side view of the present invention 10 and sportsman 12 as shown in FIG. 2. Shown is a sportsman 12 wearing the present invention 10. The fishing rod holder 18 being bolted at 28 to the body pad 24 can be angularly adjusted and fixedly secured by the multiple bolts 28 from further pivotal movement with bolts 28 passing through coaxial apertures 45 in body pad 24. Also shown is the lock-clamping member 30 in the open position where the user can remove the rod butt 14 for casting and working the lure. Other elements previously disclosed are also shown.

Figure 4:
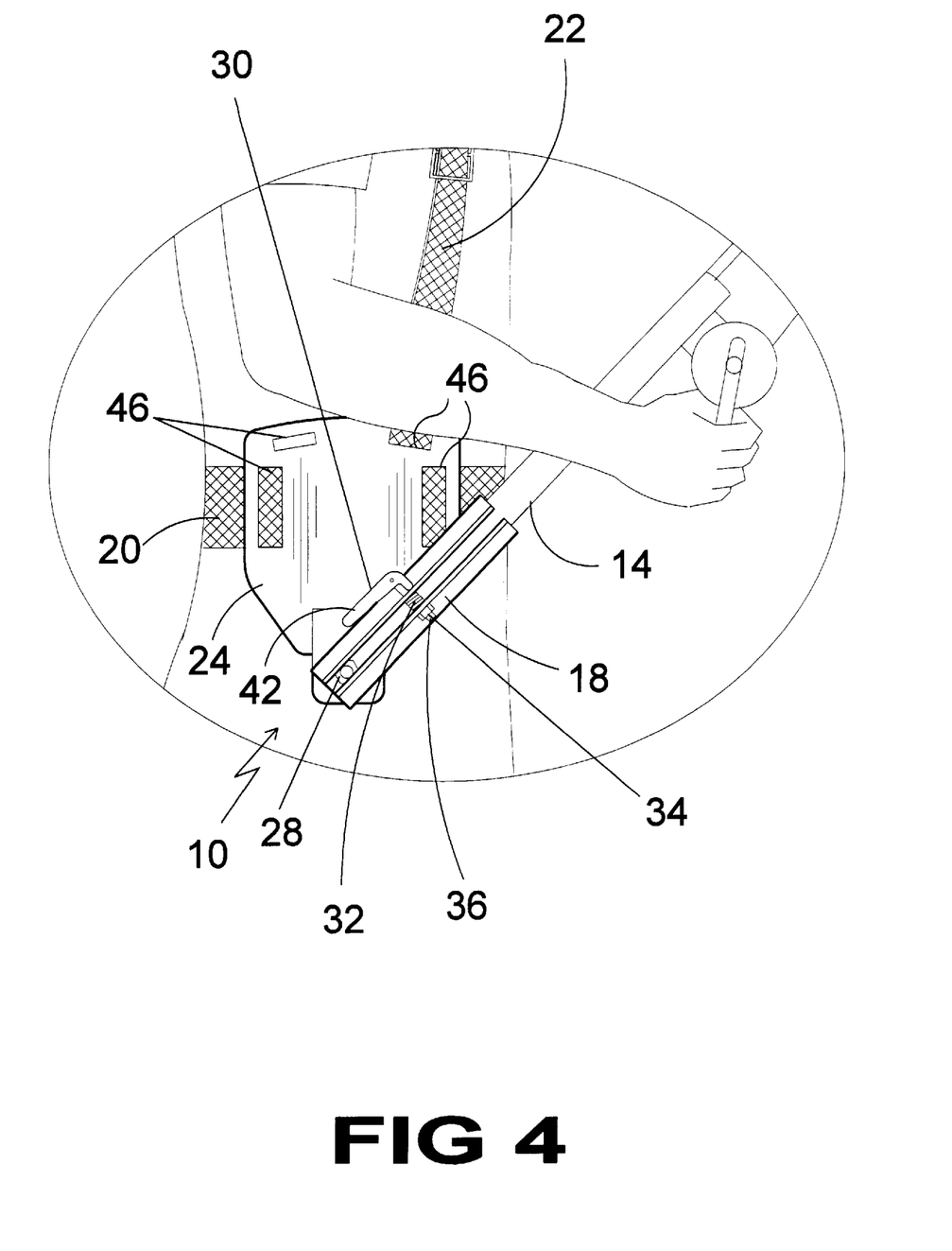
FIG. 4 is an enlarged partial view of the present invention showing the locking mechanism of the rod holder. The lock handle member is shown in the locked position wherein a spring which causes the rod holder to expand to the fully open position is compressed. Also shown is a nut exteriorly attached to a threaded member passing through the spring element. The nut can be used to increase or decrease the longitudinal gap and therein increasing or decreasing the clamping force of the rod holder on the rod.

Turning to FIG. 4, shown therein is an enlarged partial view of the present invention 10 showing the locking mechanism 30 of the elongated rod holder. The lock handle member 42 is shown in the locked position wherein a spring 32 which causes the rod holder 18 to expand to the fully open position is compressed. Also shown is a nut 34 exteriorly attached to a threaded member 36 passing through the spring element 32. The nut 34 can be used to increase or decrease the longitudinal gap and therein increasing or decreasing the clamping force of the rod holder on the rod butt 14. Apertures 46 in body pad 24 are also shown for receiving straps 20, 22. Other elements previously disclosed are also shown.

Figure 5:
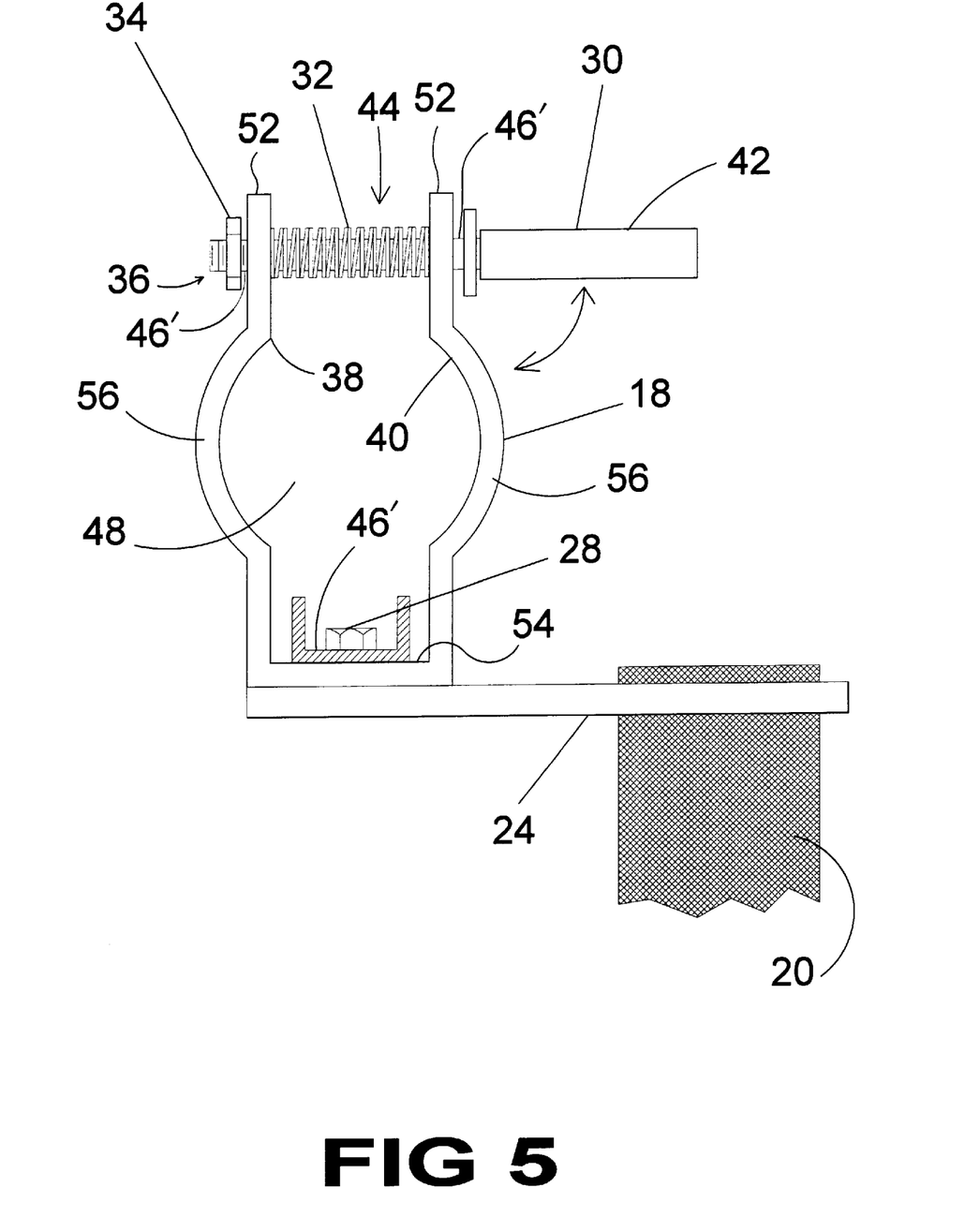
FIG. 5 is an end view of the rod holder showing a substantially U-shaped tube having a bolt fixedly attaching the rod holder to the body pad. Also shown is a threaded member passing through each side of the U-shaped member having a nut fixedly attached to one end of said threaded member for selectively increasing or decreasing the distance between the sides. Also shown is a spring element which causes the sides to expand to a fully open position and a locking handle which forced the side together thereby compressing the spring.

Turning to FIG. 5, shown therein is an end view of the rod holder 18 showing an elongated substantially U-shaped tube-like bore or aperture 48 formed by sides 38, 40 having a bolt 28 fixedly attaching the rod holder 18 to the body pad 24. Also shown is the end 36 of threaded locking member 44 passing through each side of the U-shaped member having a nut 34 fixedly attached to one end of the threaded member 44 for selectively increasing or decreasing the distance between the sides 38, 40 of rod holder 18. Also shown is a spring element 32 which causes the sides to expand to a fully open position and a locking handle 42 which forced the sides 38, 40 together thereby compressing the spring 32. Waist strap 20 is also shown. Apertures 46' are provided for bolt 28 and multiple threaded members 44. Ends 52 of sides 38, 40 are shown along with throat 54 of the U-shaped member. Sides 38, 40 are concave outwardly intermediately at 56 thereby forming a bore-like aperture 48 which is partially open on one side in the vicinity of the ends 52 of sides 38, 40.

Figure 6:
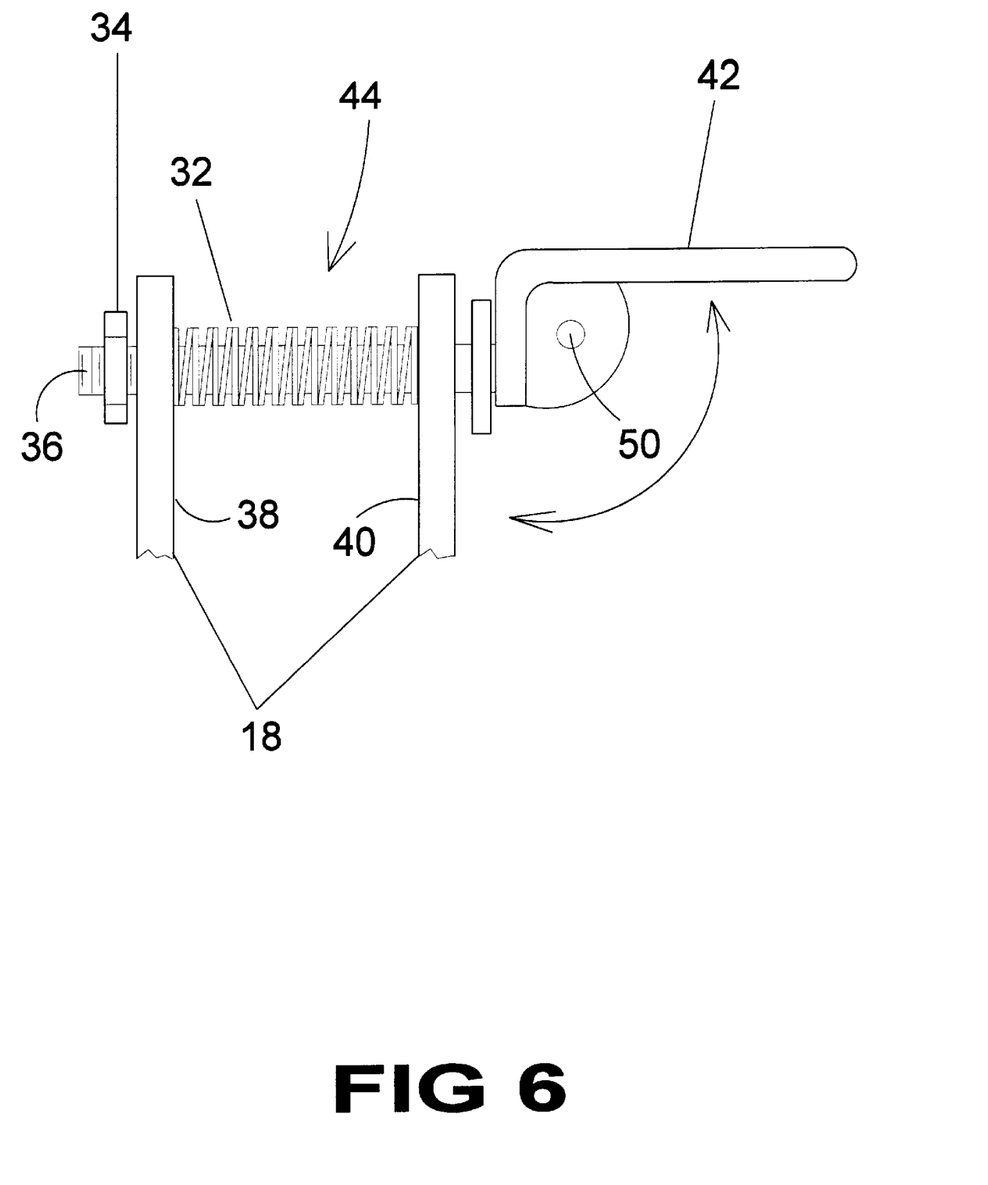
FIG. 6 is a cutaway end view of the rod holder showing the sides of the U-shaped tube. The shaft element passing through each side of the U-shaped member has an adjustable fastener fixedly attached on the threaded end for selectively increasing or decreasing the gap between the sides. Pivotally attached to the other end is the L-shaped lever in the open position which is determined by having the longest end of the lever parallel to the shaft element. The shaft element mounted spring forces the tube sides into a spaced apart condition. This configuration provides the user with a single means for selectively releasing the fishing rod from the holder while still maintaining the positioning of the rod within the holder.

Turning to FIG. 6, shown therein is a cutaway end view of the rod holder 18 showing the sides 38, 40 of the U-shaped tube. The shaft element 44 passing through each side of the U-shaped member has an adjustable fastener 34 fixedly attached on the threaded end 36 for selectively increasing or decreasing the gap between the sides 38, 40. Pivotally 50 attached to the other end is the L-shaped lever 42 shown in the open position which is determined by having the longest end of the lever parallel to the shaft element 44. The shaft element 44 mounted spring 32 forces the tube sides 38, 40 into a spaced apart condition. This configuration provides the user with a single means for selectively releasing the fishing rod from the holder 18 while still loosely maintaining the positioning of the rod within the holder 18.

Figure 7:
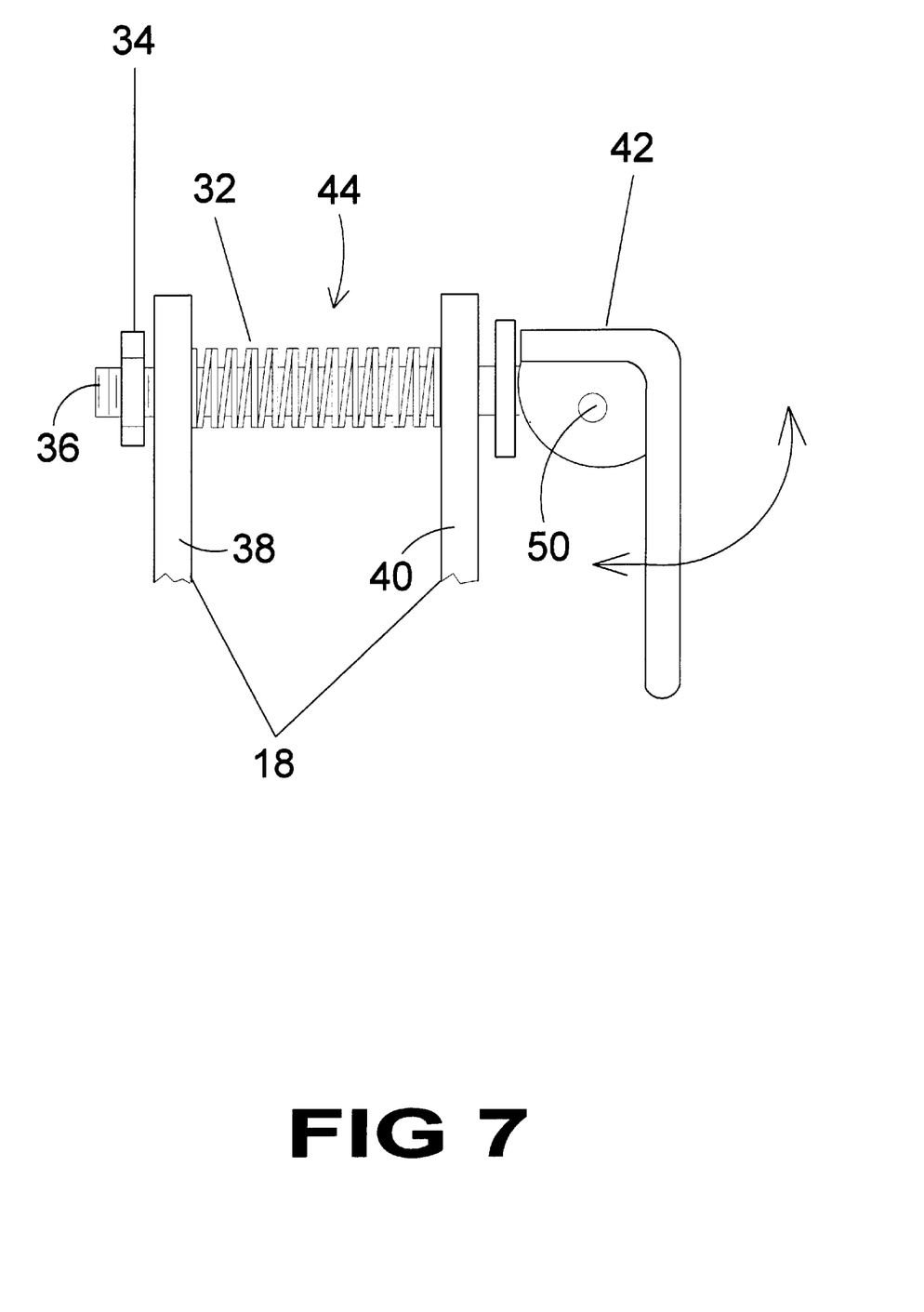
FIG. 7 is a cutaway end view of the rod holder showing the sides of the U-shaped tube. The shaft element passing through each side of the U-shaped member has an adjustable fastener fixedly attached on the threaded end for selectively increasing or decreasing the gap between the sides. Pivotally attached to the other end is the L-shaped lever in the open position which is determined by having the shortest end of the lever in a transaxle position to the shaft element. The shaft element mounted spring forces the tube sides into a spaced apart condition. This configuration provides the user with a single means for selectively positioning the rod within the holder and selectively clamping therein by pivoting the lever until the short end is parallel to the shaft element.

Turning to FIG. 7, shown therein is a cutaway end view of the rod holder 18 showing the side 38, 40 of the U-shaped tube. The shaft element 44 passing through each side of the U-shaped member has an adjustable fastener 34 fixedly attached on the threaded end 36 for selectively increasing or decreasing the gap between the sides 38, 40. Pivotally attached to the other end is the L-shaped lever 42 shown in the locked position which is determined by having the longest end of the lever 42 perpendicular to the shaft element 44. The shaft element 44 mounted spring 32 forces the tube sides into a spaced apart condition. This configuration provides the user with a single means for selectively positioning the rod within the holder 18 and selectively clamping the rod therein by pivoting the lever 42 until the long end is perpendicular to the shaft element 44.

What is claimed to be new and desired to be protected by Letters Patent is set forth in the appended claims:

1. An apparatus for holding a fishing rod to the body of a user, comprising:

a) a substantially planar body member;

b) multiple body strap members for connecting said body member to a waist of a user;

c) a rod holder for holding therein a butt of a fishing rod;

d) means for attaching said rod holder to said body member comprising bolt means including multiple bolts along a bottom of said rod holder for engagement with said body member to allow said rod holder to be pivoted in a plane substantially parallel with the plane of said planar body member to a selected angle and locked in place;

e) said rod holder comprising an elongated U-shaped clamping member with free ends, curved sides and said bottom to accommodate said rod butt, said free ends joined by a rod member surrounded by a spring tending to separate said free ends on said rod member, and an L-shaped member being associated with said rod member to lock and unlock said rod butt toggled between a first position clamping said sides against said rod butt to hold said butt in place and a second position allowing said spring to further separate said free ends to allow insertion and removal of said rod butt, said L-shaped member being located along a side of said rod holder facing an arm of said user for ease of use.

2. The apparatus of claim 1, said body member sized for placement on the side of the body of a user.

3. The apparatus of claim 1, wherein said body member is made of flexible material.

4. The apparatus of claim 1, wherein said body member is made of substantially rigid material.

5. The apparatus of claim 1, said multiple body strap members comprising a waist strap.

6. The apparatus of claim 5, further comprising a buckle disposed on said waist strap for adjusting said waist strap about the body of the user.

7. The apparatus of claim 1, said multiple body strap members comprising a shoulder strap.

8. The apparatus of claim 7, further comprising a buckle disposed on said shoulder strap for adjusting said shoulder strap about the body of the user.

9. The apparatus of claim 3, wherein said flexible material is leather.

10. The apparatus of claim 4, wherein said rigid material is plastic.

* * * * *